United States Patent
Ren et al.

(10) Patent No.: US 12,186,856 B1
(45) Date of Patent: Jan. 7, 2025

(54) GRINDING ROBOT FOR INSIDE WALL OF SMALL DIAMETER PIPES

(71) Applicant: CHENGDU UNIVERSITY OF TECHNOLOGY, Sichuan (CN)

(72) Inventors: Tao Ren, Chengdu (CN); Qingyou Liu, Chengdu (CN); Gang Jiang, Chengdu (CN); Yujia Li, Chengdu (CN); Zheng Jiang, Chengdu (CN); Yachuan You, Chengdu (CN); Lin Xian, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/628,733

(22) Filed: Apr. 7, 2024

(30) Foreign Application Priority Data

Jun. 13, 2023 (CN) .......................... 202310694996.X (51) Int. Cl.
  *B24B 5/40* (2006.01)
  *B24B 5/18* (2006.01)
  (Continued)

(52) U.S. Cl.
  CPC ................ *B24B 5/40* (2013.01); *B24B 5/185* (2013.01); *B25J 11/0065* (2013.01)

(58) Field of Classification Search
  CPC .. B24B 5/06; B24B 5/40; B24B 5/185; B24B 9/007; B24B 19/02; B24B 33/02;
  (Continued)

(56) References Cited

U.S. PATENT DOCUMENTS

| 3,230,668 | A | * | 1/1966 | Stanley | ................... B08B 9/051 |
| | | | | | 451/344 |
| 4,084,484 | A | * | 4/1978 | Shklyanov | ........... B23D 79/023 |
| | | | | | 409/300 |

(Continued)

FOREIGN PATENT DOCUMENTS

| CN | 203495764 U | 3/2014 |
| CN | 106239284 A | 12/2016 |

(Continued)

OTHER PUBLICATIONS

Notification to Grant Patent Right for Invention in Chinese Application No. 202310694996.X mailed on Jul. 21, 2023, 6 pages.

(Continued)

*Primary Examiner* — Eileen P Morgan
(74) *Attorney, Agent, or Firm* — Porus IP LLC (57) ABSTRACT

The present disclosure provides a grinding robot for an inside wall of a small diameter pipe. The grinding robot includes a grinding device, a transmission device, and a driving device. By arranging the grinding robot into the above three portions, the overall bending pipe passability of the robot can be increased, which is convenient for the grinding robot to grind the small diameter pipe. A first gimbal and two second gimbals provided in the transmission device enable the grinding robot to flexibly pass through bends of the pipe, and enable a grinding driving force to be variably transmitted to the grinding device. When the grinding body rotates and contacts a pipe wall, a reaction force of the pipe wall on the grinding body is balanced by an adjusting spring adjustment force in a balance adjusting device and a self-weight of a grinding body.

5 Claims, 6 Drawing Sheets

(51) Int. Cl.
  *B24B 33/02* (2006.01)
  *B24B 47/12* (2006.01)
  *B25J 11/00* (2006.01)

(58) Field of Classification Search
  CPC ..... B24B 33/022; B24B 39/02; B24B 41/002;
    B24B 41/02; B24B 47/02; B24B 47/08;
    B24B 47/10; B24B 47/12; B24B 47/22;
    B25J 11/0065; B23B 5/162
  USPC .................................... 451/51, 61, 179, 180
  See application file for complete search history.

(56) References Cited

U.S. PATENT DOCUMENTS

| | | | | | |
|---|---|---|---|---|---|
| 4,327,526 | A | * | 5/1982 | Pettyjohn | B24B 5/40 409/143 |
| 4,460,920 | A | * | 7/1984 | Weber | G21C 17/017 165/11.2 |
| 4,887,585 | A | * | 12/1989 | Nutt | F16L 55/28 451/182 |
| 5,046,289 | A | * | 9/1991 | Bengel | G21F 9/005 451/75 |
| 5,054,976 | A | * | 10/1991 | Akesaka | E03F 3/06 409/143 |
| 5,062,187 | A | * | 11/1991 | Bromley | B23B 29/02 408/81 |
| 5,899,795 | A | * | 5/1999 | Penza | B23D 79/023 451/61 |
| 6,220,130 | B1 | * | 4/2001 | Beakley | B23B 5/162 82/136 |
| 6,917,176 | B2 | * | 7/2005 | Schempf | G01N 29/265 901/44 |
| 2014/0014381 | A1 | * | 1/2014 | Anda | E21B 29/10 173/31 |
| 2015/0300654 | A1 | | 10/2015 | Liu et al. | |

FOREIGN PATENT DOCUMENTS

| | | |
|---|---|---|
| CN | 107649470 A | 2/2018 |
| CN | 216265000 U | 4/2022 |
| CN | 217060050 U | 7/2022 |
| ES | 2273610 A1 | 5/2007 |
| JP | 2004268190 A | 9/2004 |

OTHER PUBLICATIONS

Wang, Huizhi et al., Grinding Force Analysis and Experiment for Finishing Processing of Long Tube Inner Surface by Using Floating Grinding Head, Machine Tool & Hydraulics, 45(4), 2017, 4 pages.

Gan, Xiaoming et al., Development status of pipeline robot, Robot Technique and Application. 6: 5-10, 2003.

\* cited by examiner

GRINDING ROBOT FOR INSIDE WALL OF SMALL DIAMETER PIPES

CROSS-REFERENCE

This application claims priority to Chinese Patent Application No. 202310694996.X, filed on Jun. 13, 2023, the entire contents of which are hereby incorporated by reference.

TECHNICAL FIELD

The present disclosure relates to the field of pipe robotics, and in particular, to a grinding robot for an inside wall of a small diameter pipe.

BACKGROUND

When treating an inside wall of a pipe, some pipes with special processing have high roughness requirements for the inside wall. Over years of use, deposits and existing protrusions and weld stains on the inside wall of the transport pipe will affect pipeline wall inspection equipment in a transportation system, as well as increase impurities in the transported material. In order to meet the pipe's usage standards, improve transportation efficiency, and extend its service life, it is necessary to perform grinding treatment on the inside wall of the pipe.

The existing grinding processing device for the inside wall of pipes usually integrates driving components with grinding components, resulting in a large volume of a pipe inside wall grinding device, which is not conducive to grinding small diameter pipe. Additionally, an overall length of the device is too long, hindering the grinding device passage through pipes with large bends. The complex structure of the grinding device leads to significant grinding vibration and insufficient precision. Patent No. CN216265000U discloses a pipe inside wall grinding device, which includes a first threaded sleeve, a second threaded sleeve, an adjusting screw connected to the first and second threaded sleeves, a detachable motor connected to a front end of the second threaded sleeve, and a centrifugal deburring roller connected to the motor. Before grinding, an adjusting nut is used to recover the spacing between the first and second threaded sleeves, while an adjustable guide wheel frame is expanded to ensure proper alignment of first and second pulleys with the inside wall of the pipe. During inner pipe grinding, an appropriate centrifugal deburring roller must be selected based on the pipe's inner diameter. However, the operation of the grinding device is complex and does not allow for automatic adjustment of the support diameter according to the inner diameter of the pipe being ground. When grinding in areas with varying diameters, such as pipe bends, the device fails to adaptively adjust the grinding diameter of the grinding portion, contact force between the grinding portion and the inside wall of pipes, and grinding attitude of the grinding device, which results in uneven and poor-quality grinding. Furthermore, the current pipe inside wall grinding device lacks automatic control of the grinding time based on the specific grinding needs of different areas of the pipe, leading to excessive grinding in some areas and insufficient grinding in others, resulting in overall uneven grinding. It is important to note that the aforementioned information is intended for a better understanding of the technical solution proposed in this invention and should not be considered as endorsing the mentioned information as prior art.

Based on this, the present disclosure provides a grinding robot for an inside wall of a small diameter pipe to solve the technical problems such as low grinding efficiency, poor grinding quality, uneven grinding, and difficulty in grinding longer lengths of large curvature bends with existing grinding devices for an inside wall of a small diameter pipe.

SUMMARY

One of the embodiments of the present disclosure provides a grinding robot for an inside wall of a small diameter pipe, including: a grinding device, a transmission device, and a driving device, wherein the grinding device includes a first connecting portion; the driving device includes a second connecting portion; the transmission device includes a first gimbal and two second gimbals, the second gimbals are connected to the first connecting portion and the second connecting portion, respectively; the first gimbal passes through a hollow portion of the second gimbals; and the first gimbal transmits a grinding driving force variably from the driving device to the grinding device.

By separating the grinding device, the transmission device, and the driving device of the grinding robot for an inside wall of a small diameter pipe (hereinafter referred to as the grinding robot) into three portions, not only may the size of the grinding robot in a radial direction be reduced, but also the overall bending pipe passability of the robot is increased, which makes it easier for the grinding robot to grind a pipe of small diameter. The grinding of small pipe diameter is facilitated by the grinding robot.

In some embodiments, the driving device further includes a driving main body, a walking drive motor, an active walking wheel system, and a grinding drive motor; the walking drive motor is drive-connected to the active walking wheel system; and the grinding drive motor is drive-connected to the grinding device through the first gimbal.

In some embodiments, the driving device further includes three auxiliary walking support modules. Preferably, the auxiliary walking support modules are set to three. Each of the auxiliary walking support modules includes a first telescopic spring, an auxiliary walking support mounting frame, a first auxiliary walking wheel, and an auxiliary walking support articulating portion; the first auxiliary walking wheel is rotationally mounted on the auxiliary walking support mounting frame; the auxiliary walking support mounting frame is rotationally articulated to the driving main body via the auxiliary walking support articulating portion; and one end of the first telescopic spring is connected to the auxiliary walking support mounting frame, and the other end of the first telescopic spring is connected to the driving main body.

By the setting of the auxiliary walking support modules, the grinding robot may always fit with the inside wall of the pipe to ensure stable walking on the inside wall of the pipe; when the grinding robot turns a corner, the auxiliary walking support modules may stabilize the grinding robot when turning and prevent rollover.

In some embodiments, the transmission device further includes a second gimbal connecting plate, second gimbal bearings, tuck bolts, and sleeves, the second gimbal connecting plate is connected to the two second gimbals, respectively; each of the second gimbals is provided with the second gimbal bearings on sidewalls along a first direction and a second direction, respectively; the tuck bolts are threaded through the sidewalls of the second gimbals along the first direction and the second direction, and the first direction may be an up and down direction or height direction, and the second direction may be a left and right direction or width direction; the sleeves are sleeved on the tuck bolts and are located between the second gimbal bearings and an end of the tuck bolts for avoiding interference between the outer ring of the bearings and the tuck bolts; the first connecting portion is movably sleeved on the tuck bolts of one of the second gimbals; and the second connecting portion is movably sleeved on the tuck bolts of the other of the second gimbals.

The second gimbals are capable of dynamically adjusting a torsion angle between the grinding device, the transmission device, and the driving device of the grinding robot arranged in the forward and backward directions, so as to enable the grinding robot to flexibly pass through the pipe bends; and the first gimbal is capable of dynamically adjusting the grinding driving force output from the driving device, so that the grinding driving force may be variably transmitted to the grinding device. In some embodiments, the grinding device includes a rotary grinding module and a rotary grinding mounting frame, the rotary grinding module being mounted on the rotary grinding mounting frame.

The rotary grinding module includes a main body, a grinding drive input shaft, a grinding drive input shaft gear, a grinding body, and a speed reduction assembly; one end of the grinding drive input shaft is drive-connected to the first gimbal, and the other end is drive-connected to the grinding drive input shaft gear, and the grinding drive input shaft gear transmits the grinding driving force to the grinding body through the speed reduction assembly.

In some embodiments, the speed reduction assembly includes an input pulley shaft gear, an input pulley shaft, an input pulley, an output pulley, an input pulley mounting frame, an output pulley shaft, an output pulley mounting frame, and the input pulley shaft gear is driven in mesh with the grinding drive input shaft gear; one end of the input pulley shaft is connected to the input pulley shaft gear, and the other end of the input pulley shaft is connected to the input pulley; the input pulley is drive-connected to the output pulley; one end of the output pulley shaft is connected to the output pulley, and the other end of the output pulley shaft is connected to the grinding body.

In some embodiments, the transmission structure adopts gear transmission, which has advantages of smooth movement, high transmission accuracy, and long service life.

In some embodiments, the speed reduction assembly further includes a slewing bearing, a belt drive auxiliary connection plate, a second output pulley shaft bearing, an output pulley shaft sleeve, a spacer block, a first output pulley shaft bearing, and a long bolt; the slewing bearing supports the input pulley shaft, an outer ring of the slewing bearing is mounted on one end surface of the input pulley mounting frame, and an inner ring is connected to the belt drive auxiliary connection plate; the first output pulley shaft bearing and the second output pulley shaft bearing support two ends of the output pulley shaft, respectively; the first output pulley shaft bearing is equipped with the spacer block on a side near the grinding body; the input pulley mounting frame and the output pulley mounting frame are mounted on the belt drive auxiliary connection plate; the output pulley shaft sleeve is provided between the spacer block and the belt drive auxiliary connection plate; and the long bolt connects the output pulley mounting frame and the spacer block.

In some embodiments, the connection between the input pulley and the output pulley may be strengthened by the provision of the belt drive auxiliary connection plate to make the structure of the speed reduction assembly more solid.

In some embodiments, the rotary grinding module further includes a grinding body clamp plate, the grinding body clamp plate securing the grinding body by fastening screws to make the grinding body mounted and stable.

In some embodiments, the grinding device further includes a revolving module, the revolving module is connected to the rotary grinding module, and the revolving module drives the rotary grinding module to make a circular rotation around the inside wall of the pipe.

In some embodiments, the revolving module includes a revolving support plate, a toothed-ring bearing, a revolving output gear, a revolving motor, and a connecting column body; the revolving motor rotates the revolving output gear through an output shaft, and the revolving output gear meshes with a gear train of an outer ring of the toothed-ring bearing for transmission; an inner ring of the toothed-ring bearing is connected to the revolving support plate; and the outer ring of the toothed-ring bearing is connected to the rotary grinding mounting frame through the connecting column body.

In some embodiments, the revolving module drives the rotary grinding module to make a circular rotation around the inside wall of the pipe, and through this setup, a grinding body smaller than the pipe diameter is able to complete grinding operations on the inside wall of the pipe, and at the same time, it may satisfy the operational needs of the helix grinding and other operations to ensure the integrity of the grinding.

In some embodiments, the rotary grinding module further includes a balance adjusting device, the balance adjusting device includes an adjusting spring, a first adjusting spring positioning pin, and a second adjusting spring positioning pin; the first adjusting spring positioning pin is mounted on the rotary grinding mounting frame, the second adjusting spring positioning pin is mounted on the output pulley mounting frame; and two ends of the adjusting spring are connected to the first adjusting spring positioning pin and the second adjusting spring positioning pin, respectively.

In some embodiments, when the grinding body rotates to contact the inside wall of the pipe, a reaction force of the wall on the grinding body is balanced by an adjustment force of the adjusting spring in a balance adjusting device and a self-weight of a grinding body to make the grinding in a relatively stable state, and when grinding, the balance adjusting device provides a suitable grinding contact force between the grinding body and the inside wall of the pipe.

In the straight pipe grinding, the curvature of the pipe does not change, the adjusting spring provides a relatively constant radial adjustment force, so that the grinding body grinds the inside wall of the pipe with an appropriate contact force. At the pipe bend, the curvature of the pipe changes, the contact force between the grinding body and the wall changes. At this time, due to the action of the adjusting spring, the grinding body can dynamically adjust the contact force with the inside wall of the pipe, so that it can well contact the inner wall of the pipe for grinding operations.

In some embodiments, a plurality of second auxiliary wheels are provided external to the main body. Preferably, in some embodiments, the second auxiliary wheels are provided as four.

In some embodiments, the grinding device further includes a pipe diameter adjusting auxiliary wheel, a pipe diameter adjusting auxiliary wheel mounting plate, an auxiliary wheel mounting plate spring, and a movable hinge disposed at the end of the main body; one end of the auxiliary wheel mounting plate spring is connected a to the main body, the other end is connected to the pipe diameter adjusting auxiliary wheel mounting plate, the pipe diameter adjusting auxiliary wheel is mounted on the pipe diameter adjusting auxiliary wheel mounting plate, and the movable hinge is hingedly connected to the main body.

In some embodiments, the provision of the pipe diameter adjusting auxiliary wheel enables the grinding device to contact the inside wall of the pipe in a smooth manner, which is able to reduce the vibration generated by grinding and improve the quality of the grinding.

In some embodiments, the grinding robot for an inside wall of a small diameter pipe further includes an automatic grinding program control system, the automatic grinding program control system includes an automatic grinding runtime program, the automatic grinding runtime program being run through an automatic grinding program processor.

In some embodiments, the automatic grinding runtime program includes: setting a walking speed of the grinding robot in the inside wall of the pipe according to a revolving speed of the revolving module, a width size of the grinding body, and a rotational speed of the grinding body to regulate a grinding feed amount realizing automatic adjustable grinding operations; wherein the revolving speed of the revolving module and the rotational speed of the grinding body may be set according to the pipe grinding roughness requirements.

Optional, the automatic grinding runtime program may be set to low revolving speed and high rotary speed, and the walking speed of the grinding robot is set to that: if the revolving module takes the time t1 for one revolution, then the grinding robot walks a width size distance of the grinding body within time t1, thereby realizing automatic quantitative polishing. Optional, the automatic grinding runtime program may be set to low revolving speed and low rotary speed, and the walking speed of the grinding robot is set to that: if the revolving module takes the time t2 for one revolution, then the grinding robot walks a width size distance of the grinding body within time t2, thereby realizing automatic quantitative polishing.

The beneficial effects of the present disclosure include at least the following: (1) by separating the grinding device, transmission device, and driving device into three portions, the grinding robot can reduce its radial size, making it easier for the grinding robot to grind small diameter pipes; (2) by installing an auxiliary walking support module, the grinding robot can walk stably on the inside wall of the pipe, and during bends, the auxiliary walking support module can help stabilize the grinding robot to prevent it from tipping over; (3) by installing the first gimbal and second gimbals, the grinding robot can flexibly pass through pipe bends and allow the grinding driving force to be transmitted to the grinding device in a variable direction; (4) by installing the revolving module, the rotary grinding module can grind the entire circumference of the inside wall of the pipe to maintain grinding integrity; (5) in straight and curved pipes, the balance adjusting device always provides a proper grinding contact force between the grinding body and the inside wall of the pipe for smooth and uniform grinding; (6) by using the pipe diameter adjusting auxiliary wheel, the grinding device can smoothly contact the inside wall of the pipe, reducing vibrations caused by grinding.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Description of drawing markings: 100 grinding device, 200 transmission device, 300 driving device, 101 main body, 102 auxiliary wheel mounting plate spring, 103 pipe diameter adjusting auxiliary wheel, 104 pipe diameter adjusting auxiliary wheel mounting plate, 105 movable hinge, 106 connecting column body, 107 revolving support plate, 108 toothed-ring bearing, 109 revolving output gear, 110 revolving motor, 111 second auxiliary wheel, 112 grinding drive input shaft gear, 113 grinding drive input shaft, 114 long bolt, 115 first output pulley shaft bearing, 116 spacer block, 117 output pulley shaft sleeve, 118 grinding body, 119 grinding body clamp plate, 120 fastening screw, 121 belt drive auxiliary connection plate, 122 slewing bearing, 123 input pulley mounting frame, 124 output pulley, 125 input pulley, 126 input pulley shaft, 127 input pulley shaft gear, 128 first adjusting spring positioning pin, 129 rotary grinding mounting frame, 130 adjusting spring, 131 output pulley shaft, 132 second output pulley shaft bearing, 133 second adjusting spring positioning pin, 134 output pulley mounting frame, 210 first connecting portion, 220 first gimbal, 230 second gimbal, 240 second gimbal connecting plate, 250 second gimbal bearing, 260 tuck bolt, 270 sleeve, 280 second connecting portion, 320 active walking wheel system, 330 walking drive motor, 340 auxiliary walking support module, 341 first telescopic spring, 342 auxiliary walking support mounting frame, 343 first auxiliary walking wheel, 344 auxiliary walking support articulating portion, 360 grinding drive motor, and 380 driving main body.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose. The terminology used herein is for the purposes of describing particular examples and embodiments only and is not intended to be limiting. As used herein, the singular forms "a," "an," and "the" may be intended to include the plural forms as well, unless the context clearly indicates otherwise.

Figure 1:
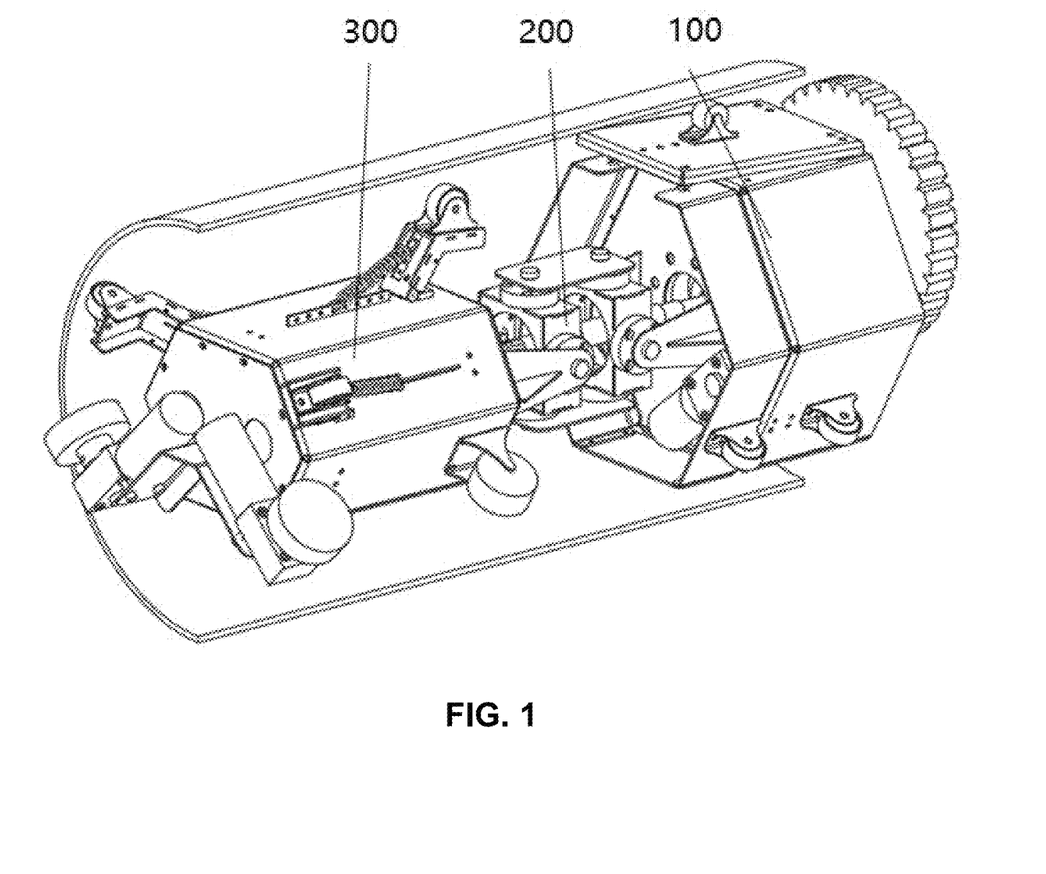
FIG. 1 is a schematic diagram illustrating a structure of a grinding robot for an inside wall of a small diameter pipe according to some embodiments of the present disclosure.
Figure 4:
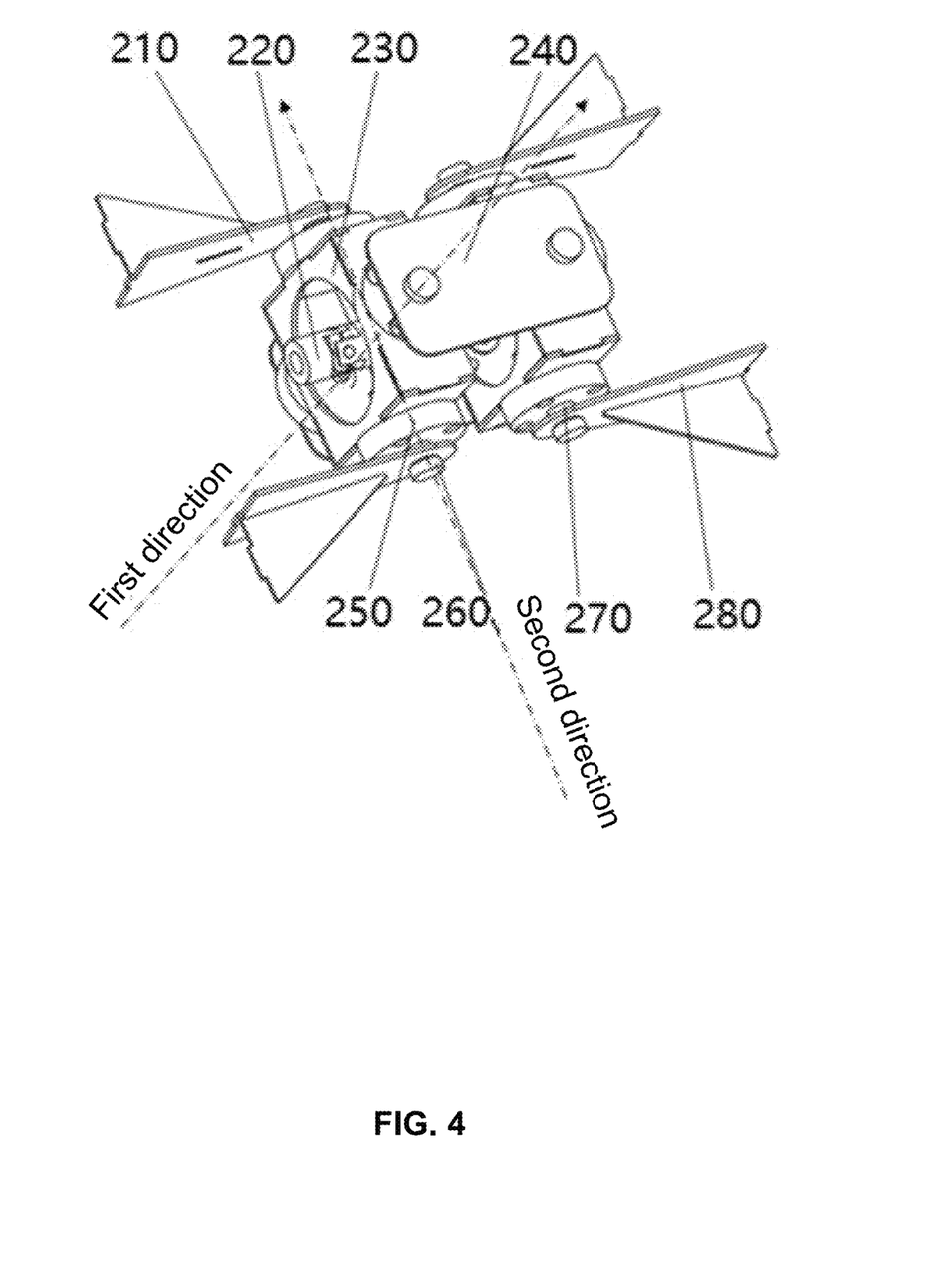
FIG. 4 is a schematic diagram illustrating a structure of a transmission device according to some embodiments of the present disclosure.

FIG. 1 is a schematic diagram illustrating a structure of a grinding robot for an inside wall of a small diameter pipe according to some embodiments of the present disclosure; and FIG. 4 is a schematic diagram illustrating a structure of a transmission device according to some embodiments of the present disclosure. Some of the following embodiments may be understood with reference to FIG. 1 and FIG. 4, but the accompanying drawings are only schematic illustrations of some of the embodiments and do not constitute a limitation of the embodiments.

In some embodiments, the grinding robot for the inside wall of the small diameter pipe includes a grinding device 100, a transmission device 200, and a driving device 300; the grinding device 100 includes a first connecting portion 210; the driving device 300 includes a second connecting portion 280; the transmission device 200 includes a first gimbal 220 and two second gimbals 230, the second gimbal 230 are connected to the first connecting portion 210 of the grinding device 100 and the second connecting portion 280 of the driving device 300, respectively; the first gimbal 220 passes through a hollow portion of the second gimbals 230; and the first gimbal 220 transmits a grinding driving force variably from the driving device 300 to the grinding device 100.

The grinding device 100 is capable of being used to grind objects, for example, an inside wall of a pipe, etc. The first connecting portion 210 of the grinding device 100 may be used to transmit power to the grinding device 100 so that the grinding device 100 may perform a grinding action. In some embodiments, the first connecting portion 210 may be used to transfer moment and/or torque.

The driving device 300 may be used to output power, for example, outputting moment and/or torque. The second connecting portion 280 of the driving device 300 may be used to transmit power output by the driving device 300.

In some embodiments, the first connecting portion 210 of the grinding device 100 and the second connecting portion 280 of the driving device 300 may be connected via the second gimbals 230, thereby connecting the grinding device 100 and the driving device 300 together.

The transmission device 200 may be used to transmit power, for example, transmitting moment and/or torque. In some embodiments, the transmission device 200 may be drive-connected between the first connecting portion 210 and the second connecting portion 280. The transmission device 200 may transmit power output from the second connecting portion 280 to the first connecting portion 210 to drive the grinding device 100 to perform an action through the first connecting portion 210.

In some embodiments, the transmission device 200 may include the first gimbal 220 and the second gimbals 230.

The first gimbal 220 and the second gimbals 230 refer to connecting structures that are capable of changing the direction of moment and/or torque. The first gimbal 220 and the second gimbals 230 may be used for power transfer. In some embodiments, the first gimbal 220 and the second gimbal 230 may have the same or different structures.

In some embodiments, the second gimbals 230 may be connected to the first connecting portion 210 of the grinding device 100 and the second connecting portion 280 of the driving device 300, respectively, to realize relative rotation of the grinding device 100 and the driving device 300.

In some embodiments, the first gimbal 220 may pass through the hollow portion of the second gimbal 230. In some embodiments, the first gimbal 220 may variably transmit a grinding driving force from the driving device 300 to the grinding device 100.

In some embodiments, the first gimbal 220 includes at least two unitary shafts, and the at least two unitary shafts are rotatably connected. By rotating the at least two unitary shafts relative to each other, an angle of the first gimbal 220 may be varied such that the first gimbal 220 may vary the angle of the transmitted moment and/or torque. For example, by the relative rotation of the at least two unitary shafts, the first gimbal 220 may be changed from a straight shape to a curved shape. In some embodiments, the first gimbal 220 includes three or more unitary shafts, and adjacent centers of rotation of the unitary shafts may be perpendicular to each other, parallel to each other, or at other angles.

In some embodiments of the present disclosure, by separately setting the grinding device 100, the transmission device 200, and the driving device 300 of the grinding robot into three portions, it can not only reduce the radial size of the grinding robot, but also increase the overall bending pipe passability of grinding the robot, which facilitates the grinding of small diameter pipes by the grinding robot.

Figure 2:
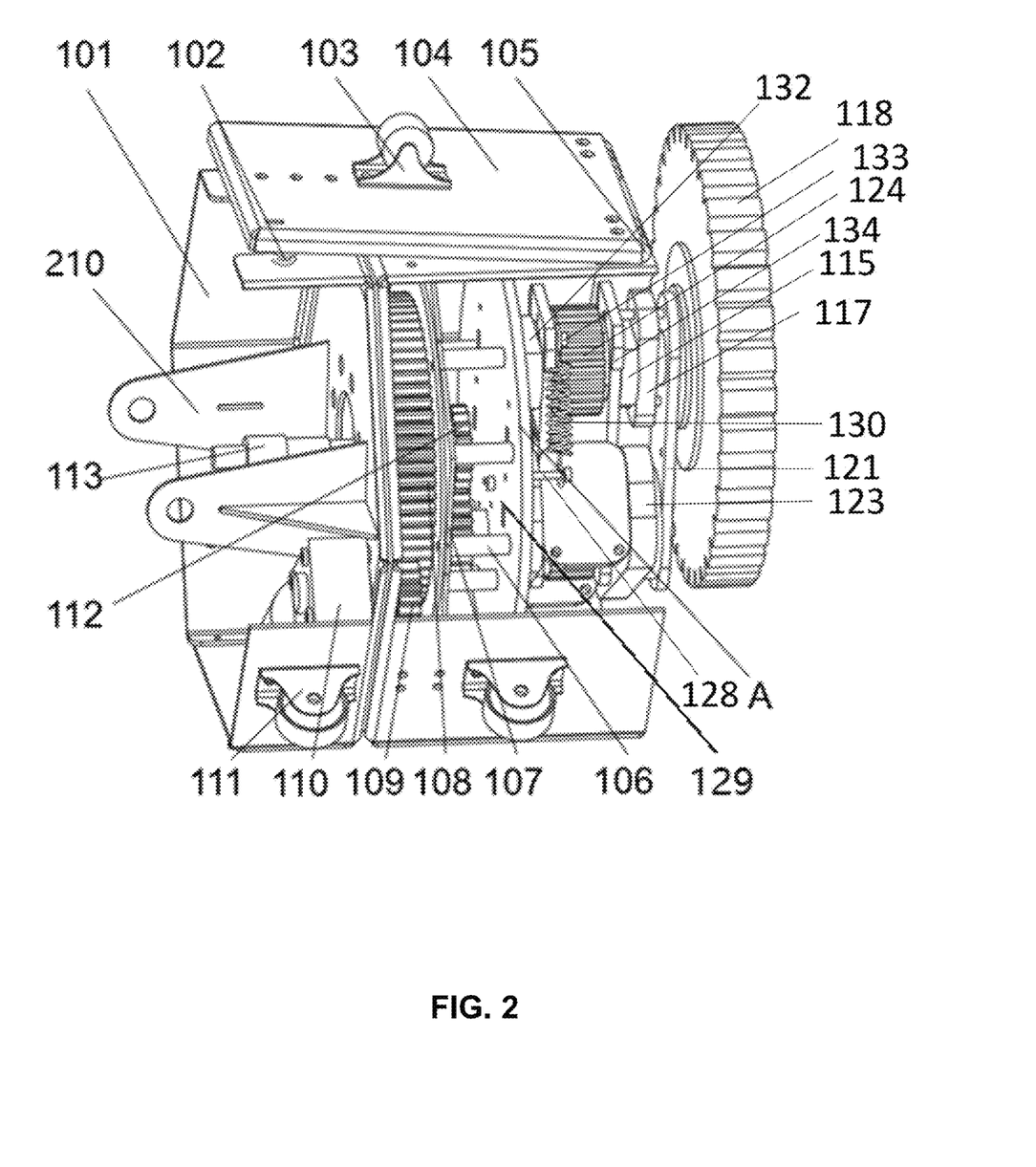
FIG. 2 is a schematic diagram illustrating a structure of a grinding device according to some embodiments of the present disclosure.
Figure 3:
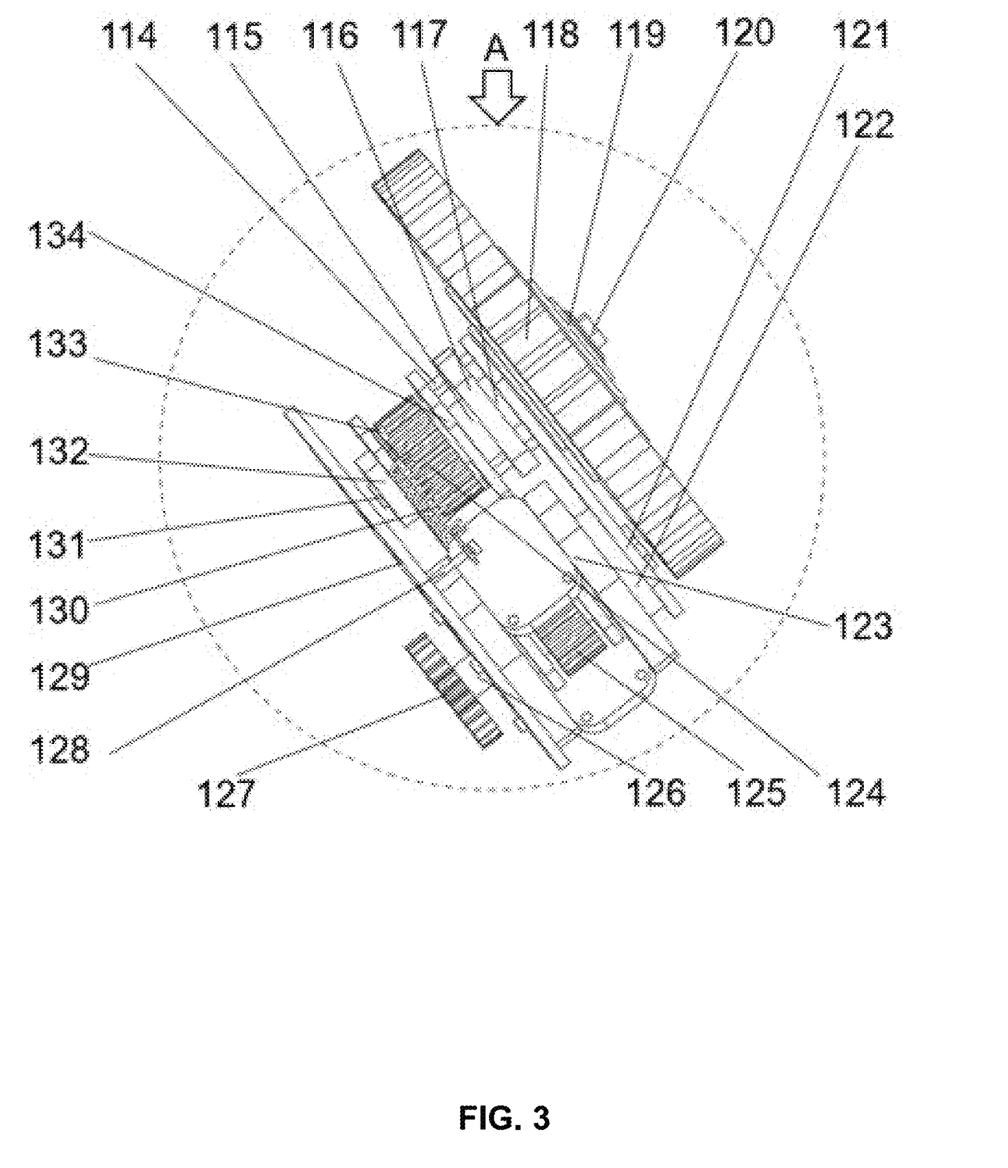
FIG. 3 is a schematic diagram illustrating a structure of a rotary grinding module according to some embodiments of the present disclosure.
Figure 6:
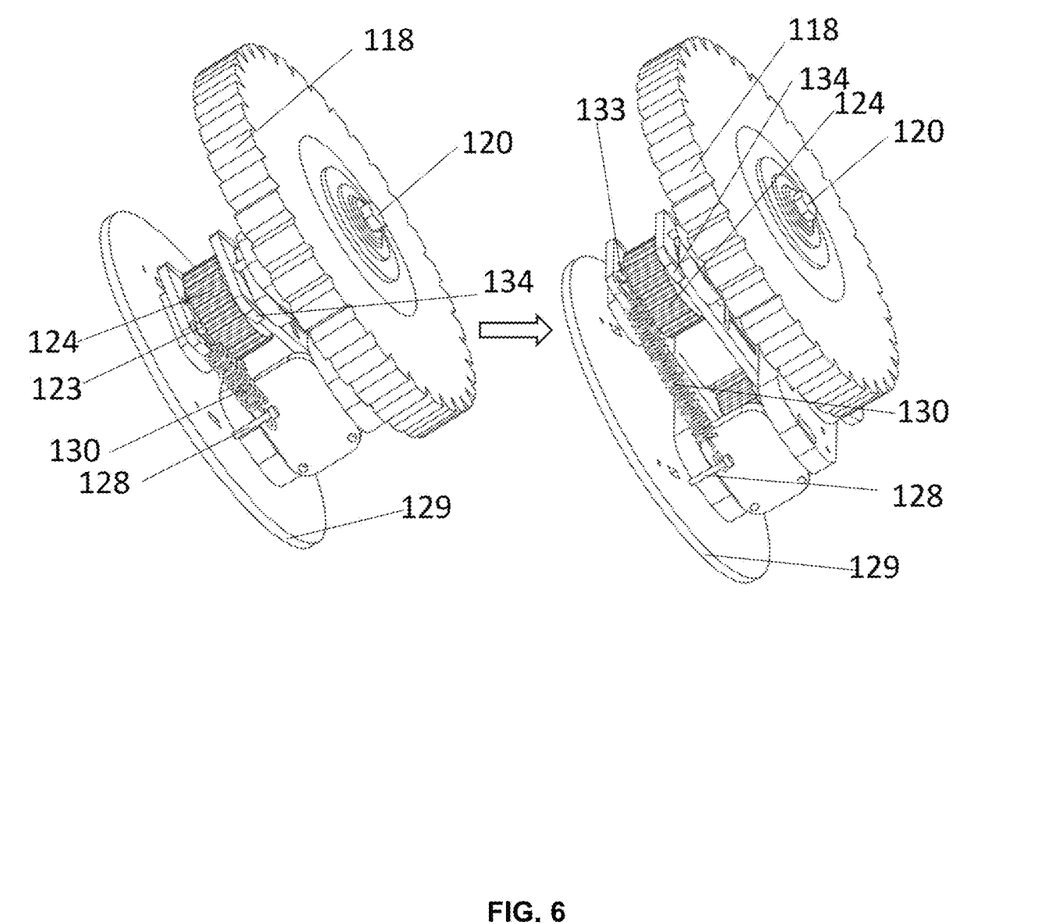
FIG. 6 is a schematic diagram illustrating an operation of a grinding device according to some embodiments of the present disclosure.

FIG. 2 is a schematic diagram illustrating a structure of a grinding device according to some embodiments of the present disclosure; FIG. 3 is a schematic diagram illustrating a structure of a rotary grinding module according to some embodiments of the present disclosure; and FIG. 6 is a schematic diagram illustrating of an operation of a grinding device according to some embodiments of the present disclosure. Some of the following embodiments may be understood with reference to FIG. 2, FIG. 3, and FIG. 6, but the accompanying drawings are only a schematic illustration of some of these embodiments, and do not constitute a limitation of the embodiments.

In some embodiments, the grinding device 100 includes a rotary grinding module and a rotary grinding mounting frame 129, with the rotary grinding module being mounted on the rotary grinding mounting frame 129, as illustrated in FIGS. 2 and 3.

The rotary grinding module is capable of grinding. The rotary grinding mounting frame 129 serves as a mounting base for the rotary grinding module.

In some embodiments, as shown in FIGS. 2, 3, and 6, the rotary grinding module includes a main body 101, a grinding drive input shaft 113, a grinding drive input shaft gear 112, a grinding body 118, and a speed reduction assembly. In some embodiments, one end of the grinding drive input shaft 113 is drive-connected to the first gimbal 220, and the other end is drive-connected to the grinding drive input shaft gear 112; the grinding drive input shaft gear 112 transfers a grinding driving force to the grinding body 118 via the speed reduction assembly.

The main body 101 is a main structure of the grinding device 100, and may be used to provide a supportive force and a mounting base for other components or modules of the grinding device 100. In some embodiments, the main body 101 is mounted with the first connecting portion 210, and the main body 101 may be connected to the second gimbals 220 in the transmission device 200 via the first connecting portion 210. In some embodiments, a reinforcing rib plate may be provided between the main body 101 and the first connecting portion 210 to improve the strength as well as the deformation resistance of the first connecting portion 210.

The grinding drive input shaft 113 may be used to transmit power. In some embodiments, the grinding drive input shaft 113 is threaded into the main body 101. In some embodiments, the grinding drive input shaft 113 may be rotationally connected to the main body 101.

The grinding body 118 is a structure that enables a grinding function, for example, a grinding wheel, a milling cutter, etc. In some embodiments, the grinding body 118 may be a disk-shaped structure. The grinding body 118 may also be any other feasible structure and is not limited herein.

The speed reduction assembly is a transmission structure that may act as a speed reducer, for example, a gear reduction gearbox, or the like. In some embodiments, as shown in FIG. 3, the speed reduction assembly includes an input pulley shaft gear 127, an input pulley shaft 126, an input pulley 125, an output pulley 124, an input pulley mounting frame 123, an output pulley shaft 131, and an output pulley mounting frame 134. The input pulley shaft gear 127 is driven in mesh with the grinding drive input shaft gear 112. One end of the input pulley shaft 126 is connected to the input pulley shaft gear 127, and the other end is connected to the input pulley 125, the input pulley 125 is drive-connected to the output pulley 124; one end of the output pulley shaft 131 is connected to the output pulley 124, and the other end of the output pulley shaft 131 is connected to the grinding body 118.

In some embodiments, the input pulley mounting frame 123 and the output pulley mounting frame 134 may be separately connected to the main body 101.

In some embodiments, the first gimbal 220 drives the grinding drive input shaft 113 to rotate, the grinding drive input shaft 113 drives the grinding drive input shaft gear 112 to rotate, the grinding drive input shaft gear 112 drives the input pulley shaft gear 127 to rotate, the input pulley shaft gear 127 drives the input pulley shaft 126 to rotate, the input pulley shaft 126 drives the input pulley 125 to rotate, the input pulley 125 drives the output pulley 124 by means of a transmission connection, the output pulley 124 drives the output pulley shaft 132 to rotate, and the output pulley shaft 132 then drives the grinding body 118 to rotate. In some embodiments, the input pulley 125 and the output pulley 124 may be connected by means of a transmission connection such as belt driving.

In some embodiments of the present disclosure, a gear transmission structure is used, which makes the transmission device 200 have the advantages of smooth movement, high transmission accuracy, and long service life.

In some embodiments, as shown in FIG. 3, the speed reduction assembly further includes a slewing bearing 122, a belt drive auxiliary connection plate 121, a second output pulley shaft bearing 132, an output pulley shaft sleeve 117, a spacer block 116, a first output pulley shaft bearing 115, and a long bolt 114. The slewing bearing 122 may be used to support the input pulley shaft 126. An outer ring of the slewing bearing 122 is mounted on one end surface of the input pulley mounting frame 123, and an inner ring is connected to the belt drive auxiliary connection plate 121. The first output pulley shaft bearing 115 and the second output pulley shaft bearing 132 support two ends of the output pulley shaft 131, respectively. The first output pulley shaft bearing 115 is provided with the spacer block 116 on a side near the grinding body 118. The input pulley mounting frame 123 and the output pulley mounting frame 134 are both mounted on the belt drive auxiliary connection plate 121, and the belt drive auxiliary connection plate 121 may be connected to the main body 101. The output pulley shaft sleeve 117 is disposed between the spacer block 116 and the belt drive auxiliary connection plate 121. The long bolt 114 connects the output pulley mounting frame 134 to the spacer block 116.

In some embodiments of the present disclosure, the connection between the input pulley and the output pulley can be strengthened by the provision of the belt drive auxiliary connection plate 121, so that the structure of the speed reduction assembly is more solid.

In some embodiments, the rotary grinding module further includes the grinding body clamp plate 119, and the grinding body clamp plate 119 secures the grinding body 118 via the fastening screw 120, making the grinding body installation stable. In some embodiments, the fastening screw 120 may be threadedly connected to the output pulley shaft 131.

In some embodiments, the grinding device 100 further includes a revolving module, which is connected to the rotary grinding module, and which is capable of driving the rotary grinding module to make a circular rotation around the inside wall of the pipe.

In some embodiments, as shown in FIG. 2, the revolving module includes a revolving support plate 107, a toothed-ring bearing 108, a revolving output gear 109, a revolving motor 110, and a connecting column 106.

In some embodiments, the revolving motor 110 may be provided on the main body 101. The revolving motor 110 drives the revolving output gear 109 to rotate through an output shaft, and the revolving output gear 109 meshes with a gear train of an outer ring of the toothed-ring bearing 108 to drive; an inner ring of the toothed-ring bearing 108 is connected to the revolving support plate 107; the inner ring of the toothed-ring bearing 108 is connected to the rotary grinding mounting frame 129 through the connecting column 106.

In some embodiments of the present disclosure, by setting the revolving module to drive the rotary grinding module to make a circular rotation around the inside wall of the pipe, a grinding body smaller than the pipe diameter is able to complete grinding operations on the inside wall of the pipe, and at the same time, it may satisfy the operational needs of the helix grinding and other operations to ensure the integrity of the grinding.

In some embodiments, as shown in FIG. 3, the rotary grinding module may further include a balance adjusting device. In some embodiments, the balance adjusting device includes an adjusting spring 130, a first adjusting spring positioning pin 128, and a second adjusting spring positioning pin 133.

The first adjusting spring positioning pin 128 is mounted on the rotary grinding mounting frame 129, and the second adjusting spring positioning pin 133 is mounted on the output pulley mounting frame 134. Two ends of the adjusting spring 130 are connected to the first adjusting spring positioning pin 128 and the second adjusting spring positioning pin 133, respectively.

When the grinding body 118 rotates to contact the inside wall of the pipe, a reaction force of the wall on the grinding body 118 is balanced by an adjustment force of the adjusting spring 130 in a balance adjusting device and a self-weight of a grinding body 118 to make the grinding in a relatively stable state, and when grinding, the balance adjusting device provides a suitable grinding contact force between the grinding body 118 and the inside wall of the pipe.

In the straight pipe grinding, the curvature of the pipe does not change, the adjusting spring 130 provides a relatively constant radial adjustment force, so that the grinding body 118 grinds the inside wall of the pipe with an appropriate contact force. At the pipe bend, the curvature of the pipe changes, the contact force between the grinding body 118 and the wall changes. At this time, due to the action of the adjusting spring 130, the grinding body 118 can dynamically adjust the contact force with the inside wall of the pipe, so that it can well contact the inner wall of the pipe for grinding operations.

In some embodiments, a plurality of second auxiliary wheels 111 are provided externally of the main body 101, as shown in FIG. 2. Preferably, the second auxiliary wheels 111 are provided as four. The second auxiliary wheels 111 are capable of forming a rolling connection with the inside wall of the pipe to form a support for the main body 101, which is conducive to improving the stability of the main body 101. In some embodiments, the second auxiliary wheels 111 may be uniformly distributed on the outer circumference of the main body 101.

In some embodiments, as shown in FIG. 2, the grinding device 100 further includes a pipe diameter adjustment auxiliary wheel 103, a pipe diameter adjustment auxiliary wheel mounting plate 104, an auxiliary wheel mounting plate spring 102, and a movable hinge 105 disposed at the end of the main body 101.

One end of the auxiliary wheel mounting plate spring 102 is connected to the main body 101, and the other end is connected to the pipe diameter adjusting auxiliary wheel mounting plate 104. In some embodiments, one or both ends of the pipe diameter adjusting auxiliary wheel mounting plate 104 may be hingedly connected to the main body 101 via the movable hinge 105.

The pipe diameter adjusting auxiliary wheel 103 is mounted on a side of the pipe diameter adjusting auxiliary wheel mounting plate 104 toward the inside wall of the pipe, and in some embodiments, the pipe diameter adjusting auxiliary wheel 103 may be in rolling connection with the inside wall of the pipe. The auxiliary wheel mounting plate spring 102 may act as a cushion to dampen vibration.

In some embodiments of the present disclosure, by setting the pipe diameter adjusting auxiliary wheel 103, the grinding device 100 can contact the inside wall of the pipe in a smooth manner, which can reduce the vibration generated by grinding and improve the quality of grinding.

FIG. 4 is a schematic diagram illustrating a structure of a transmission device according to some embodiments of the present disclosure. Some of the following embodiments may be understood with reference to FIG. 4, but the accompanying drawings are only a schematic illustration of some of these embodiments and do not constitute a limitation of the embodiments.

In some embodiments, as shown in FIG. 4, the transmission device 200 further includes a second gimbal connecting plate 240, second gimbal bearings 250, tuck bolts 260, and sleeves 270.

In some embodiments, the second gimbal connecting plate 240 is used to connect the two second gimbals 230. In some embodiments, there may be two second gimbal connecting plates 240, and the two second gimbal connecting plates 240 are located on opposite sides. In some embodiments, the second gimbal connecting plates 240 may be rotationally connected to the two second gimbals 230, respectively. The formation of two rotating pairs between the grinding device 100 and the driving device 300 may improve the flexibility of the grinding device 100 when rotating relative to the driving device 300, and improve the adaptability to pipe bends.

In some embodiments, each second gimbal 230 is provided with the second gimbal bearings 250 at a center of the sidewalls along a first direction and a second direction, respectively. Referring to FIG. 4, the first direction may be a top and bottom or height direction of the transmission device 200, and the second direction may be a left and right or width direction of the transmission device 200.

In some embodiments, an outer ring of the second gimbal bearing 250 is fixedly connected to the second gimbal 230. An inner ring of the second gimbal bearing 250 may rotate relative to the outer ring.

In some embodiments, the tuck bolts 260 are threaded through the sidewalls of the second gimbal 230 along the first direction and the second direction. In some embodiments, the tuck bolts 260 may be threaded with the second gimbal 230. In some embodiments, the tuck bolts 260 may be coaxial with the second gimbal bearing 250.

In some embodiments, the sleeve 270 is socketed to the tuck bolt 260 and is disposed between the second gimbal bearing 250 and an end of the tuck bolt 260. In some embodiments, the sleeve 270 may rotate relative to the tuck bolt 260. In some embodiments, the sleeve 270 may be connected to an inner ring of the second gimbal bearing 250.

In some embodiments, the first connecting portion 210 is movably sleeved to the tuck bolt 260 of one of the second gimbals 230; and the second connecting portion 280 is movably sleeved to the tuck bolt 260 of the other of the second gimbals 230. In some embodiments, the center of rotation of the first connecting portion 210 or the second connecting portion 280 with the second gimbal 230 may be perpendicular to the center of rotation of the second gimbal 230 with the second gimbal connecting plate 240, enabling an increased number of rotating subsets between the grinding device 100 and the driving device 300, thereby improving the flexibility of the grinding device 100 when rotating relative to the driving device 300.

In some embodiments of the present disclosure, by setting the second gimbals 230, it is possible to dynamically adjust the torsion angle between the grinding device 100, the transmission device 200, and the driving device 300 of the grinding robot arranged in a front-back direction, enables the grinding robot to flexibly pass through a pipe bend, avoiding that the overall length of the grinding robot is greater than the length of the bend and get stuck at the bend. The first gimbal 220 can dynamically adjusting the grinding driving force output from the driving device 300, so that the grinding driving force can be variably transmitted to the grinding device 100.

Figure 5:
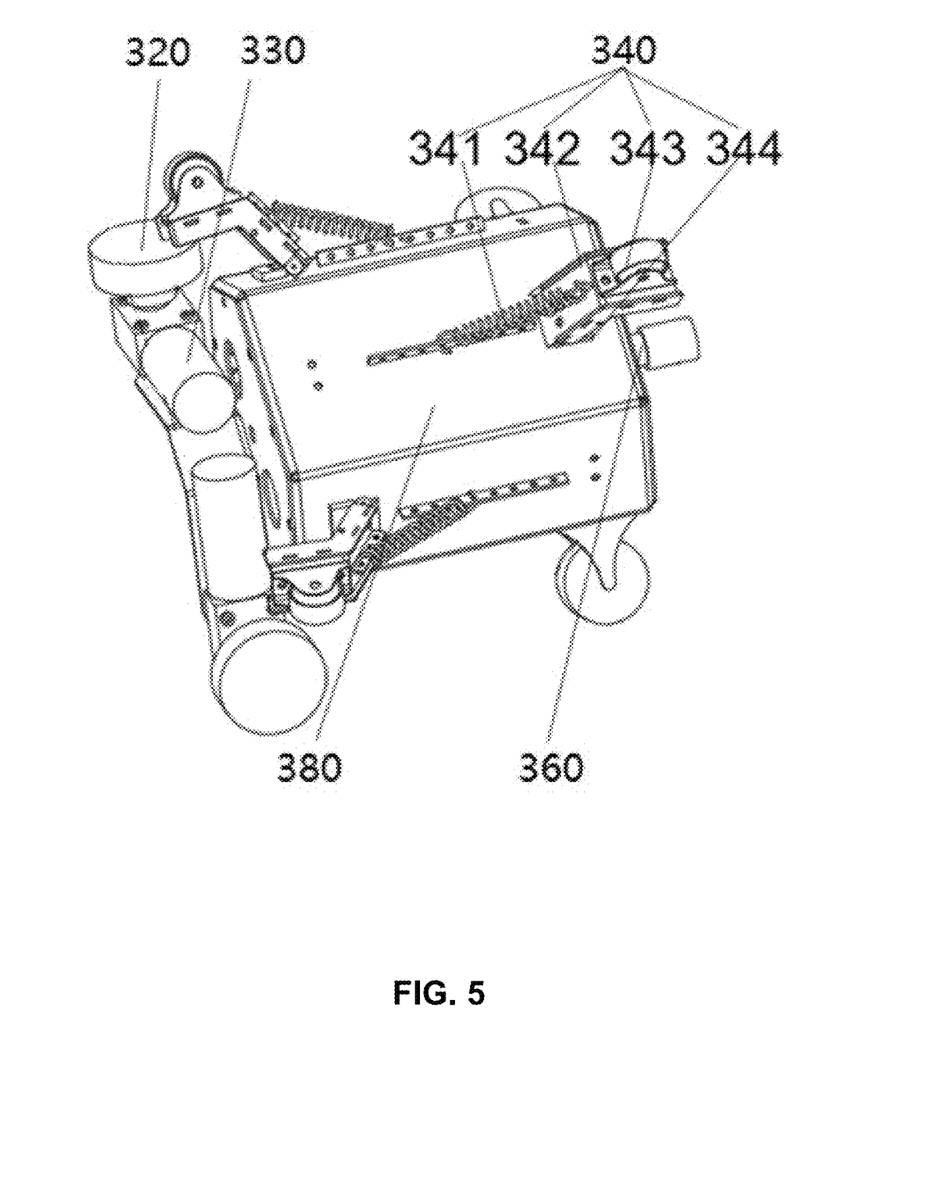
FIG. 5 is a schematic diagram illustrating a structure of a driving device according to some embodiments of the present disclosure.

FIG. 5 is a schematic diagram illustrating a structure of a driving device according to some embodiments of the present disclosure. Some of the following embodiments may be understood with reference to FIG. 4, but the accompanying drawings are only a schematic illustration of some of these embodiments, and do not constitute a limitation of the embodiments.

In some embodiments, as shown in FIG. 5, the driving device 300 further includes a driving main body 380, a walking drive motor 330, an active walking wheel system 320, and a grinding drive motor 360. The walking drive motor 330 is driveably connected to the active walking wheel system 320, and the grinding drive motor 360 is driveably connected to the grinding device 100 via the first gimbal 220.

The driving main body 380 may be used as a mounting base for mounting structures such as the walking drive motor 330, the active walking wheel system 320, the grinding drive motor 360, or the like. In some embodiments, the driving main body 380 may be a rotary body type structure. In some embodiments, the driving main body 380 may be a prismatic structure, for example, at least one of a quadrangular prism, a hexagonal prism, or the like.

The walking drive motor 330 is a motor that is powered to drive the grinding robot to walk along the pipe.

The active walking wheel system 320 refers to a wheel structure capable of driving the grinding robot to walk along the pipe. In some embodiments, the active walking wheel system 320 may include one or more rollers that may be rollingly connected to the inside wall of the pipe. In some embodiments, the rollers may be drive-connected to the walking drive motor 330. The walking drive motor 330 may output a torque to drive the rollers. In some embodiments, the walking drive motor 330 may drive a plurality of rollers to rotate simultaneously. In some embodiments, the rollers may be evenly distributed around the diameter of the pipe. In some embodiments, the center of rotation of the rollers may be adaptively adjustable along a radial direction of the pipe.

The grinding drive motor 360 refers to a motor that provides power to drive the grinding device 100. In some embodiments, the grinding drive motor 360 may be drive-connected to the first gimbal 220 to transmit the output moment and/or torque to the first gimbal 220, and then transmit the output moment and/or torque to the grinding device 100 via the first gimbal 220.

In some embodiments, the driving device 300 further includes three auxiliary walking support modules 340.

The auxiliary walking support module 340 may be used to provide support to the grinding robot as the grinding robot moves along the pipe. In some embodiments, the auxiliary walking support module 340 may roll frictional contact with the pipe. In some embodiments, the auxiliary walking support module 340 may be resiliently connected to the pipe.

In some embodiments, the auxiliary walking support module 340 may also be provided in other numbers, for example, two, four, or more. In some embodiments, the plurality of auxiliary walking support modules 340 may be disposed in a ring around the axis of the pipe.

In some embodiments, the auxiliary walking support module 340 includes a first telescopic spring 341, an auxiliary walking support mounting frame 342, a first auxiliary walking wheel 343, and an auxiliary walking support articulating portion 344. The first auxiliary walking wheel 343 is rotationally mounted on the auxiliary walking support mounting frame 342; the auxiliary walking support mounting frame 342 is rotationally articulated to the driving main body 380 via the auxiliary walking support articulating portion 344; one end of the first telescopic spring 341 is connected to the auxiliary walking support mounting frame 342, and the other end is connected to the driving main body 380.

The auxiliary walking support mounting frame 342 serves as a mounting base that may be used to mount the first auxiliary walking wheel 343. In some embodiments, the auxiliary walking support mounting frame 342 is provided on the driving main body 380. In some embodiments, the driving main body 380 adopts a prismatic structure, which may provide a flat surface for the auxiliary walking support mounting frame 342 as a mounting base, which is conducive to improving the stability of the auxiliary walking support mounting frame 342.

The first auxiliary walking wheel 343 may contact the inside wall of the pipe to provide support for the grinding robot. In some embodiments, the first auxiliary walking wheel 343 may be in rolling frictional contact with the inside wall of the pipe. In some embodiments, the first auxiliary walking wheel 343 may be disposed at an end of the auxiliary walking support mounting frame 342.

The auxiliary walking support articulating portion 344 refers to a component that allows for rotational connection of two structures. In some embodiments, the auxiliary walking support articulating portion 344 is provided between the auxiliary walking support mounting frame 342 and the driving main body 380, which may enable the auxiliary walking support mounting frame 342 and the driving main body 380 to be rotationally connected. By rotating the auxiliary walking support mounting frame 342 with the driving main body 380, the angle of the auxiliary walking support mounting frame 342 may be adaptively adjusted to accommodate pipes of different diameters, improving the grinding robot's range of application.

The first telescopic spring 341 may be used to provide elasticity. In some embodiments, the first telescopic spring 341 is connected between the auxiliary walking support mounting frame 342 and the driving main body 380. In some embodiments, the first telescopic spring 341, the auxiliary walking support mounting frame 342, and the driving main body 380 may be formed around to form a triangular structure. Using the first telescopic spring 341 to provide elasticity, the first auxiliary walking wheel 343 may be kept in contact with the inside wall of the pipe, ensuring that the grinding robot walks stably on the inside wall of the pipe. When the grinding robot bends, the auxiliary walking support mounting frame 342 adaptively adjusts the angle under the action of the first telescopic spring 341, so that the first auxiliary walking wheel 343 is always in contact with the inside wall of the pipe, which enables the robot to be stabilized when turning without tipping over.

In some embodiments, the grinding robot further includes an automatic grinding program control system.

The automatic grinding program control system is a system that enables automatic control functions. In some embodiments, the automatic grinding program control system may include a processor, etc. The automatic grinding program control system may realize functions such as collecting, analyzing, processing, and storing data, and may generate and store control instructions, and may issue control instructions to an actuator to perform a corresponding action or function. For example, the automatic grinding program control system may be communicatively connected to the walking drive motor 330, the grinding drive motor 360, the revolving motor 110, or the like, respectively. The automatic grinding program control system may issue control instructions to the walking drive motor 330, the grinding drive motor 360, the revolving motor 110, or the like, respectively, so that the walking drive motor 330, the grinding drive motor 360, the revolving motor 110, or the like, respectively, may perform at least one of functions such as starting, shutting down, changing power, or the like, respectively.

In some embodiments, the automatic grinding program control system may include an automatic grinding runtime program, the automatic grinding runtime program being run through the processor.

In some embodiments, the automatic grinding runtime program includes: setting a walking speed of the grinding robot in the inside wall of the pipe according to a revolving speed of the revolving module, a width size of the grinding body, and a rotational speed of the grinding body to regulate a grinding feed amount realizing automatic adjustable grinding operations; wherein the revolving speed of the revolving module and the rotational speed of the grinding body may be set according to the pipe grinding roughness requirements.

In some embodiments, the automatic grinding runtime program may be set to low revolving speed and high rotary speed, and the walking speed of the grinding robot is set to that: if the revolving module takes the time t1 for one revolution, then the grinding robot walks a width size distance of the grinding body within time t1, thereby realizing automatic quantitative polishing.

In some embodiments, the automatic grinding runtime program may be set to low revolving speed and low rotary speed, and the walking speed of the grinding robot is set to that: if the revolving module takes the time t2 for one revolution, then the grinding robot walks a width size distance of the grinding body within time t2, thereby realizing automatic quantitative polishing.

In the present disclosure, when working, after installing the grinding body 118, the grinding robot for an inside wall of a small diameter pipe is placed inside the pipe, the driving device 300 is turned on, and the walking drive motor 33 drives the grinding robot to move along the inside wall of the pipe.

The grinding drive motor 360 transmits the grinding driving force to the grinding body 118 for grinding the inside wall of the pipe in a variable direction via the transmission device 200.

By setting the grinding device 100, the transmission device 200, and the driving device 300 separately into three portions, the size of the grinding robot in the radial direction is reduced, facilitating the grinding of small diameter pipes by the grinding robot.

When encountering uneven spots on the inside wall of the pipe, the auxiliary walking support module 340 ensures the grinding robot walks stably on the inside wall of the pipe.

By setting the second gimbal 230, the transmission device 200 can flexibly adjust the angle, so that the grinding robot can smoothly pass through the pipe bend.

The revolving motor 110 drives the rotary grinding module through the revolving module to grind the inside wall of the pipe in one full revolution, ensuring the integrity of the grinding.

In the straight pipe grinding, the curvature of the pipe does not change, the adjusting spring 130 provides a relatively constant radial adjustment force, so that the grinding body 118 grinds the inside wall of the pipe with an appropriate contact force. At the pipe bend, the curvature of the pipe changes, the contact force between the grinding body 118 and the wall changes. At this time, due to the action of the adjusting spring 130, the grinding body 118 can dynamically adjust the contact force with the inside wall of the pipe, so that it can well contact the inner wall of the pipe for grinding operations.

The setting of the pipe diameter adjusting auxiliary wheel 103 enables the grinding device to contact the inside wall of the pipe in a smooth manner, which can reduce the vibration generated by grinding.

The preferred embodiments of the present disclosure disclosed above are only used to help illustrate the present disclosure. The preferred embodiments do not describe all details, nor do they limit the invention to specific implementations. Obviously, many modifications and variations are possible in light of the contents of the present disclosure. These embodiments are selected and described in detail in the present disclosure to better explain the principles and practical applications of the present disclosure, so that those skilled in the art can better understand and utilize the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. A grinding robot for an inside wall of a small diameter pipe, comprising a grinding device, a transmission device, and a driving device, wherein the grinding device includes a first connecting portion;

the driving device includes a second connecting portion;
the transmission device includes a first gimbal, two second gimbals, a second gimbal connecting plate, second gimbal bearings, tuck bolts, and sleeves;
   the second gimbals are connected to the first connecting portion and the second connecting portion, respectively; the first gimbal passes through a hollow portion of the second gimbals; the first gimbal transmits a grinding driving force variably from the driving device to the grinding device;
   the second gimbal connecting plate is connected to the two second gimbals, respectively; each of the second gimbals is provided with the second gimbal bearings on sidewalls along a first direction and a second direction, respectively;
   the tuck bolts are threaded through the sidewalls of the second gimbals along the first direction and the second direction; the first connecting portion is movably sleeved on the tuck bolts of one of the second gimbals; and the second connecting portion is movably sleeved on the tuck bolts of the other of the second gimbals;
   the sleeves are sleeved on the tuck bolts and are located between the second gimbal bearings and an end of the tuck bolts;
the grinding device further includes a rotary grinding module, a rotary grinding mounting frame, and a revolving module; the rotary grinding module is mounted on the rotary grinding mounting frame, the revolving module is connected to the rotary grinding module, and the revolving module drives the rotary grinding module to rotate circumferentially around the inside wall of the pipe;
the rotary grinding module includes a main body, a grinding drive input shaft, a grinding drive input shaft gear, a grinding body, and a speed reduction assembly;
   one end of the grinding drive input shaft is drive-connected to the first gimbal, and the other end of the grinding drive input shaft is drive-connected to the grinding drive input shaft gear; the grinding drive input shaft gear transmits the grinding driving force to the grinding body through the speed reduction assembly;
   the speed reduction assembly includes an input pulley shaft gear, an input pulley shaft, an input pulley, an output pulley, an input pulley mounting frame, an output pulley shaft, and an output pulley mounting frame; and
      the input pulley shaft gear is driven in mesh with the grinding drive input shaft gear; one end of the input pulley shaft is connected to the input pulley shaft gear, and the other end of the input pulley shaft is connected to the input pulley; the input pulley is drive-connected to the output pulley; one end of the output pulley shaft is connected to the output pulley, and the other end of the output pulley shaft is connected to the grinding body.

2. The grinding robot according to claim 1, wherein the driving device further includes a driving main body, a walking drive motor, an active walking wheel system, and a grinding drive motor; the walking drive motor is drive-connected to the active walking wheel system; and the grinding drive motor is drive-connected to the grinding device through the first gimbal.

3. The grinding robot according to claim 2, wherein the driving device further includes three auxiliary walking support modules; each of the auxiliary walking support modules includes a first telescopic spring, an auxiliary walking support mounting frame, a first auxiliary walking wheel, and an auxiliary walking support articulating portion;
   the first auxiliary walking wheel is rotationally mounted on the auxiliary walking support mounting frame;
   the auxiliary walking support mounting frame is rotationally articulated to the driving main body via the auxiliary walking support articulating portion; and
   one end of the first telescopic spring is connected to the auxiliary walking support mounting frame, and the other end of the first telescopic spring is connected to the driving main body.

4. The grinding robot according to claim 1, wherein the rotary grinding module further includes a grinding body clamp plate and a fastening screw; and the grinding body clamp plate fastens the grinding body using the fastening screw.

5. The grinding robot according to claim 4, wherein the rotary grinding module further includes a balance adjusting device, and the balance adjusting device includes an adjusting spring, a first adjusting spring positioning pin, and a second adjusting spring positioning pin;
   the first adjusting spring positioning pin is mounted on the rotary grinding mounting frame, and the second adjusting spring positioning pin is mounted on the output pulley mounting frame; and
   two ends of the adjusting spring are connected to the first adjusting spring positioning pin and the second adjusting spring positioning pin, respectively.

\* \* \* \* \*